United States Patent [19]

Fouche

[11] Patent Number: 5,376,343
[45] Date of Patent: Dec. 27, 1994

[54] PRODUCTION OF PURIFIED CALCIUM CARBONATE

[75] Inventor: Pierre M. Fouche, Alberton, South Africa

[73] Assignee: Pretoria Portland Cement Company Limited, Johannesburg, South Africa

[21] Appl. No.: 23,624

[22] Filed: Feb. 26, 1993

[30] Foreign Application Priority Data

Feb. 26, 1992 [ZA] South Africa .................. 92/1408

[51] Int. Cl.$^5$ ................................ C01F 5/24
[52] U.S. Cl. ........................ 423/165; 423/432
[58] Field of Search ...................... 423/165, 432

[56] References Cited

U.S. PATENT DOCUMENTS

| | | | |
|---|---|---|---|
| 3,320,026 | 5/1967 | Waldeck | 23/66 |
| 3,920,800 | 11/1975 | Harris | 423/432 |
| 4,157,379 | 6/1979 | Arika et al. | 423/432 |
| 4,714,603 | 12/1987 | Vanderheiden | 423/432 |
| 5,164,172 | 11/1992 | Katayama et al. | 423/432 |
| 5,232,678 | 8/1993 | Bleakley et al. | 423/432 |

FOREIGN PATENT DOCUMENTS

| | | | |
|---|---|---|---|
| 0197327 | 10/1986 | European Pat. Off. | |
| 2261227 | 9/1975 | France | |
| 207714 | 9/1987 | Japan | 423/432 |
| 1049815 | 11/1966 | United Kingdom | |

OTHER PUBLICATIONS

Database WPIL, *Cubic calcium carbonate particles production*, Agency of Ind. Science Tech, Sep. 30, 1986 (Abstract).

Database WPIL, *Calcium carbonate having aragonite crystal structure production*, Maruo Calcium KK, Apr. 12, 1988 (Abstract).

*Primary Examiner*—Wayne Langel
*Attorney, Agent, or Firm*—Hill, Steadman & Simpson

[57] ABSTRACT

A method of producing relatively pure calcium carbonate from a relatively impure source of calcium oxide, characterized in that the method comprises the steps of slaking the calcium oxide source in water to produce an aqueous hydrated lime slurry;

treating the slurry by the addition thereto of a water soluble source of anions which anions are capable of forming a salt with calcium ions which salt has a dissociation constant greater than the dissociation constant of calcium hydroxide;

separating the solid content of the slurry from the liquid fraction content thereof to obtain a substantially solids-free solution of calcium ions and anions;

intimately contacting the solids-free liquid fraction with carbon dioxide gas at a selected rate to maintain the temperature of the solution within a specific range and to lower the pH of the solution to a pre-set value conducive for the formation of a precipitate of calcium carbonate in which one of the crystalline forms, selected from the group consisting of calcite, vaterite and aragonite, predominates;

and separating the precipitated calcium carbonate from the mother liquor.

19 Claims, No Drawings

PRODUCTION OF PURIFIED CALCIUM CARBONATE

BACKGROUND OF THE INVENTION

This invention relates to a method of producing high purity calcium and magnesium carbonate. The invention relates particularly to the production of specific crystalline forms of high purity calcium carbonate from relatively impure calcium source material.

Calcium carbonate and magnesium carbonate are natural carbonates which are present in large quantities particularly in calcitic and dolomitic limestone. In raw impure form these products are used in various industries including the mining and cement industries. In purified form calcium carbonate is used in the production of white paint, in toothpaste, paper coating and as a filler in pharmaceutical products. Likewise, in pure form magnesium carbonate finds application in various fields, e.g. in the steel industry.

Despite their natural abundance pure calcium carbonate and magnesium carbonate are relatively expensive products due to the difficulties and expenses associated with the conventional purification methods.

It is an object of the present invention to provide a new method for producing reprecipitated calcium carbonate from a natural source material containing calcium and optionally also recovering magnesium carbonate therefrom, if the latter is present in the source material.

SUMMARY OF THE INVENTION

According to the present invention there is provided a method of producing relatively pure calcium carbonate from a relatively impure source of calcium oxide, the method comprising the steps of slaking the calcium oxide source in water to produce an aqueous hydrated lime slurry; treating the slurry by the addition thereto of a water soluble source of anions which anions are capable of forming a salt with calcium ions which salt has a dissociation constant greater than the dissociation constant of calcium hydroxide; separating the solid content of the slurry from the liquid fraction content thereof to obtain a substantially solids-free solution of calcium ions; intimately contacting the solids-free liquid fraction with carbon dioxide gas at a selected rate to maintain the temperature of the solution within a specific range and to lower the pH of the solution to a pre-set value conducive for the formation of a precipitate of calcium carbonate in which one of the crystalline forms, selected from the group consisting of calcite, vaterite and aragonite, predominates; and separating the precipitated calcium carbonate from the mother liquor.

The carbonation rate, temperature ranges and pH values conducive to the formation of specific crystalline forms of calcium carbonate are dealt with in greater detail below.

DETAILED DESCRIPTION OF THE PRESENTLY PREFERRED EMBODIMENTS

In the preferred form of the invention the anion source is selected to be capable of being regenerated during carbonation of the liquid fraction. Most preferably the anion source is an ammonium salt. Thus, the anion source may be selected from ammonium chloride and ammonium nitrate.

Also according to the invention the separation of the solid and liquid phases of the slurry is effected by filtering the slurry under pressure through a filter presenting pores of less than about 1 micron, and most preferably of the order of 0.22 micron in diameter to obtain a substantially solid free filtrate.

In one form of the invention the mother liquor may be further treated to recover magnesium carbonate therefrom should economically significant quantities of magnesium be present in the mother liquor as would be expected to be the case when the calcium oxide source is a dolomitic lime or, to a lesser extent, a calcitic lime.

The calcium oxide source used in the process of the invention may thus be either a calcitic or a dolomitic lime derived from the calcination of limestone in an industrial kiln.

The unslaked lime is preferably slaked in water in a stirred vessel using a water to lime ratio of between about 3.5 and 5.0:1.

The filtration of the treated slurry to obtain the substantially solids free solution of calcium ions in water is preferably carried out through a ceramic microfilter or ceramic ultrafilter.

The pore size of the filter is preferably in the range of between 0.01 and 0.5 but most preferably about 0.22 micron in diameter. The filter element is preferably of tubular configuration thus allowing the slurry to be pumped under pressure through the tubular filter element while part of the solution migrates through the pores of the tubular wall.

Such filters are commercially available from various sources including CSIR in Pretoria, South Africa, Millipore (Pty.) Limited, Johannesburg and Membratech (Pty.) Limited of Paarl.

The slurry is preferably pumped through the tubular filter at a pressure of between 3 and 4 bar.

In use the substantially free flow of the slurry has a self-cleaning effect on the filter element but if and when necessary flow of the filtrate may be reversed to clean the filter element. In addition, when necessary a dilute solution of hydrochloric acid may be passed through the filter element to clean it.

The slurry passing through the tubular filter element is re-cycled to the slurry stock and the required pumpable consistency Of the slurry is maintained by the addition of make-up water.

The calcium and anion containing filtrate is intimately contacted with gaseous carbon dioxide by bubbling the gas through the filtrate. Preferably the gas is bubbled through the filtrate with the aid of an aeration device giving a controllable bubble size below 50 microns in diameter. Such aeration devices are known in the trade. In an alternative arrangement the gas stream may be introduced into the filtrate via a ceramic microfilter element by which the gas stream is broken up into a multiplicity of minute gas streams.

The liquid-gas contact is preferably maintained until the RH of the solution had been lowered to a value of between 7.0 and 8.5 [depending on the type of calcium carbonate to be formed as will be explained below], thus resulting in the precipitation of substantially all the calcium carbonate from the solution and the simultaneous re-dissolution of such magnesium carbonate as may have co-precipitated with the calcium carbonate should magnesium values have been present in the solution. During these reactions the anion source, if selected with this purpose in mind, may be regenerated. Thus where ammonium nitrate is used as anion source, the filtrate will contain calcium, ammonium hydroxide and nitrate ions [as well as possibly magnesium ions depending on the nature of the calcium oxide source]. During carbonation the calcium ions are precipitated as calcium carbonate, the ammonium and nitrate ions remain in solution and the hydroxide ions are neutralised to water.

In the application of the present invention for the production of high purity calcium carbonate in which the calcite crystal form predominates, it is preferred to have the calcium in a solution in which the concentration is greater than 5% [mass to mass $Ca(OH)_2$ in $H_2O$] and to carbonate the solution at a rate of less than or equal to about 1 liter $CO_2$-gas per minute per liter of solution until the pH of the solution has dropped to below 8, while the temperature of the solution is kept in the range between $-20°$ C. and $20°$ C.

In this application of the invention the $Ca(OH)_2$ concentration is most preferably about 10% [mass to mass], the carbonation rate is most preferably about 1 liter $CO_2$ per minute administered as a 20% [volume by volume] mixture in nitrogen, while the temperature of the solution is maintained at approximately $15°$ C., until the pH of the solution has reduced to 7.0 with associated precipitation of $CaCO_3$ predominantly in the calcite form.

The process of the invention may alternatively be used to produce pure calcium carbonate in which the crystals are predominantly in the vaterite crystalline form. In this variation of the invention it is preferred to use as starting material a solution of calcium hydroxide of a concentration of about 5% or less [mass to mass] and to carbonate the solution at a temperature of between $18°$ C. and $30°$ C. by introducing a 20% $CO_2/N_2$ mixture at a rate of at least 5 liters per minute per liter solution into the solution and to terminate the carbonation when the pH of the solution reaches a value of between 8.1 and 8.3.

In the preferred form of this variation of the invention the temperature of the solution is maintained constant at $28°$ C., the carbonation rate is 3 liters per minute, and the end pH is 8.1.

In the third variation of the invention pure precipitated calcium carbonate may be produced to be predominantly in its aragonite crystal form by carbonating a less than 5% solution of $Ca(OH)_2$ in water at a temperature of between $30°$ C. and $38°$ C. with $CO_2$ at a carbonation rate of more than 9 liters per minute per liter of solution until the pH of the solution has dropped to between 8 and 8.5.

In this variation of the invention the $Ca(OH)_2$ solution most preferably has a concentration of about 1%, the temperature is maintained at $37°$ C. and the carbonation rate is above 9 liters per minute and the end pH of the process is set at 8.4.

The precipitated calcium carbonate resulting from any of the variations of the invention described above may be separated from the mother liquid from which it precipitated by way of filtration, preferably through a polymeric membrane with pore size below 1 micron.

The resulting filtrate, if it contains economically significant values of magnesium may, as pointed out before, be treated to recover such magnesium values. In this regard it is an aspect of the present invention to adjust the pH of the mother liquor solution to a value of about 10 by addition of a suitable alkali. The pH adjusted mother liquor is then again intimately contacted with carbon dioxide preferably again via an aeration arrangement as described earlier, to lower the pH of the solution to a value of between 7.5 and 9 and thereby to cause magnesium carbonate to precipitate from the solution.

Again, the precipitated magnesium carbonate is separated from the mother liquor by way of filtration, preferably through a polymeric membrane.

The resultant filtrate may be used as make-up water in the slurrying or slaking step of the process.

The yields of both the calcium and magnesium precipitations may be increased by a multi-stage procedure operated in accordance with the well-known Le Chatelier principle wherein the precipitated product is removed, the pH of the liquid phase is adjusted to a value of 10 and the liquid phase of the last stage is re-cycled to the first phase.

It is further preferred to introduce an anti-caking flocculation aiding agent into the filtered solution during the carbon dioxide contact stage. The agent preferably comprises an organic fatty acid present in the lime solution at a concentration of about 0.1% [volume by volume]. Most preferably the agent is stearic acid dissolved in ethanol.

The carbon dioxide may be from any suitable source but for economic and environmental reasons it is most preferably to use carbon dioxide from kiln or furnace flue gas as the reagent to convert the $Ca(X)_2$ to $CaCO_3$ and $Mg(X)_2$ to $MgCO_3$, where X is OH, $NO_3$ or Cl.

With the process described above it has been possible to obtain a fine calcium carbonate [0.1 to 50 microns] of a very high degree of purity and whiteness, from coloured mined limestone.

An example of the utility of the invention at laboratory scale is set out in Example 1 below.

EXAMPLE 1

1 Kg of lime obtained from our Lime Acres factory was weighed out and sampled for reflectiveness determination and found to have a whiteness of 38. Chemical analysis showed that such lime typically contained about 0.2% iron
0.7% manganese
2.0% magnesium
0.05% titanium
0.06% silica
0.2% aluminium and
96.5% calcium
all as the oxides.

The lime quantity was slaked in 4 liters of tap water and 2.4 Kg ammonium nitrate dissolved in 4 liters tap water was added to the slurry with stirring.

The resultant slurry was filtered at room temperature through a 60 cm length of a tubular ceramic microfilter [pore size 0.14 micron] having a bore of about 1.5 cm. The pumping pressure was between 3 and 4 bar. The brine was re-circulated to the slurry stock vessel and the permeate was introduced into a carbonation vessel.

The pH of the permeate was about 12.5 and was carbonated with a 20% $CO_2/N_2$ gas mixture through a microbubble sparging device until the pH reached 7. During this process $CaCO_3$ precipitated from the solution. The precipitate was filtered off through a No. 42 Whatman filter paper under vacuum, washed and dried. The product mass was found to be about 1.35 Kg which is approximately 80% theoretical yield. By conducting a multi-staged precipitation up to 90% yield has been obtained.

The product had an intense white colour of reflectivity value of 95 and particle size of 0.1 to 20 microns.

The chemical analysis of the product relative to analytical grade $CaCO_3$ was as follows:
$SiO_2$ 0.076%
$Al_2O_3$ 0.0%⁻
$Fe_2O_3$ 0.0%
$Mn_2O_3$ 0.002%
$TiO_2$ 0.008%
$MgO$ 0.004%
$CacO_3$ 99.9%

The negative sign signifies that the product had a lower value for the impurity than the analytical grade standard.

EXAMPLE 2

Production of Calcite

The utility of the invention in the production of calcite was demonstrated by dissolving 100 grams $Ca(OH)_2$ [laboratory grade] in 1000 milliliters of water and adding 220 grams $NH_4NO_3$ with stirring. The mixture was filtered under pressure of 4 bar through a tubular ceramic microfilter with pore sizes of 0.22 micron. The temperature of the filtrate was brought to 15° C. and maintained at that level during subsequent carbonation carried out by bubbling a 20% [volume to volume] $CO_2/N_2$ mixture at the rate of 1 liter per minute through the solution via a gas dispenser to obtain a fine stream of bubbles. The pH of the solution was 11.2 at the commencement of the carbonation process and carbonation was terminated when the pH had reduced to 7.0. A fine white precipitate had formed in the reaction vessel and was filtered and dried. The whiteness of the precipitated product was determined in the conventional manner with the aid of a green filter and found to be Under scanning electronmicroscope it was determined that the precipitate predominantly comprises the cubic calcite form and that the primary particles had a size distribution of 3 to 10 microns [99% of particles smaller than 10 microns].

EXAMPLE 3

Production of Vaterite

The production of the vaterite form of calcium carbonate was demonstrated by the same procedure as described in Example 2 with the difference that the concentration of the starting material was 5% [50 grams $Ca(OH)_2$ in 1 liter of water], 110 grams of $NH_4NO_3$ was used, the temperature of the filtrate maintained at 28° C. during carbonation, and the rate of carbonation was 3 liters per minute. In this example the carbonation was terminated when the pH, which was 10.9 at the commencement, had dropped to 8.1. The whiteness of the dried filtrate was 94% and electronmicroscopic investigation revealed that the primary particles predominantly had the typical rose-like crystal structure of vaterite and a size distribution of 0.1 to 1 micron [99% particles smaller than 1 micron].

EXAMPLE 4

Production of Aragonite

The production of aragonite was also demonstrated. In this instance 10 grams of $Ca(OH)_2$ was mixed in 1000 ml of water with 25 grams of $NH_4NO_3$. The filtration was carried out as described in Example 2. The clear filtrate was heated to 37° C. and was slowly added to 1000 ml of water [also at 37° C] while the water was carbonated at the rate of more than 9 liters per minute. The rate at which the $Ca(NO_3)_2$ solution was added was controlled so as to keep the pH of the carbonated mixture above 8.4. After addition of the $Ca(NO_3)_2$ the carbonation was stopped when the pH had fallen to 8.4. The precipitated crystals were filtered and dried and found to have a whiteness of 94%. Under scanning electronmicroscope the crystals were shown to have a size distribution of between 1 and 3 microns [95% smaller than 3 microns] and the long axis/short axis ratio of the primary particles ranged between 4 and 8.

Countless variations of the invention may be devised without departing from the spirit of the invention.

I claim:

1. A method of producing relatively pure calcium carbonate from a relatively impure source of calcium oxide, wherein the method comprises the steps of slaking the calcium oxide source in water to produce an aqueous hydrated lime slurry;
   treating the slurry by the addition thereto of a water soluble source of anions which anions are capable of forming a salt with calcium ions which salt has a dissociation constant greater than the dissociation constant of calcium hydroxide;
   separating the solid content of the slurry from the liquid fraction content thereof to obtain a substantially solids-free solution of calcium ions and anions;
   intimately contacting the solids-free liquid fraction with carbon dioxide gas at a selected rate to maintain the temperature of the solution within a specific range and to lower the pH of the solution to a pre-set value conducive for the formation of a precipitate of calcium carbonate in which one of the crystalline forms, selected from the group consisting of calcite, vaterite and aragonite, predominates;
   and separating the precipitated calcium carbonate from the mother liquor.

2. The method of claim 1 wherein the anion source is an ammonium salt.

3. The method of claim 1 wherein the separation of the solid and liquid phases of the slurry is effected by filtering the slurry under pressure through a filter presenting pores of less than about 1 micron in diameter to obtain a substantially solid free filtrate.

4. The method of claim 1 wherein the calcium oxide source used in the process is selected from the group consisting of: a calcitic and a dolomitic lime, wherein the calcium oxide source is derived from the calcination of limestone in a industrial kiln.

5. The method of claim 3 wherein the filtration of the treated slurry to obtain the substantially solids free solution of calcium ions in water is carried out through a ceramic microfilter or ceramic ultrafilter, the pore size of the filter preferably being in the range of between 0.01 and 0.5, and the filter element further being of tubular configuration thus allowing the slurry to be pumped under pressure through the tubular filter element while part of the solution migrates through the pores of the tubular wall.

6. The method of claim 1 wherein the calcium and anion containing solution is intimately contacted with gaseous carbon dioxide by bubbling the gas through the filtrate, and wherein the gas is bubbled through the filtrate with the aid of an aeration device giving a controllable bubble size which is below 50 microns in diameter.

7. The method of claim 1 for the production of high purity calcium carbonate in which the calcite crystal form predominates, wherein the calcium is present in a solution in a concentration greater than 5% mass to mass $Ca(OH)_2$ in $H_2O$ and the carbonation of the solution is carried out at a rate of less than or equal to about 1 liter $CO_2$-gas per minute per liter of solution until the pH of the solution has dropped to below 8, while the temperature of the solution is kept in the range between $-20°$ C. and $20°$ C.

8. The method of claim 1 for the production of pure crystalline calcium carbonate in which the crystals are predominantly in the vaterite crystalline form, wherein the starting material is a solution of calcium hydroxide of a concentration of about 5% or less (mass to mass) and the carbonation of the solution is carried out at a temperature of between $18°$ C. and $30°$ C. by introducing a 20% $CO_2/N_2$ mixture at a rate of at least 5 liters per minute per liter solution into the solution and terminating the carbonation when the pH of the solution reaches a value of between 8.1 and 8.3.

9. The method of claim 1 for the production of pure precipitated calcium carbonate crystals in which the aragonite crystal form predominates, wherein a 5% solution of $Ca(OH)_2$ in water is carbonated at a temperature of between $30°$ C. and $38°$ C. with $CO_2$ at a carbonation rate of more than 9 liters per minute per liter of solution until the pH of the solution has dropped to between 8 and 8.5.

10. The method of claim 7, wherein the precipitated calcium carbonate is separated from the mother liquid from which it precipitated by way of filtration.

11. The process of claim 1, further including the step of introducing an anti-caking flocculation aiding agent into the filtered solution during the carbon dioxide contact stage, such agent comprising an organic fatty acid present in the lime solution at a concentration of about 0.1% (volume by volume).

12. The method of claim 2 wherein the ammonium salt is selected from the group consisting of: ammonium chloride and ammonium nitrate.

13. The method of claim 3 wherein the filter is 0.22 micron in diameter.

14. The method of claim 5 wherein the filter is 0.22 micron in diameter.

15. The method of claim 10 wherein the filtration is conducted through a polymeric membrane with pore size below 1 micron.

16. The method of claim 11 wherein the fatty acid is stearic acid dissolved in ethanol.

17. A method for producing relatively pure calcium carbonate from a relatively impure source of calcium oxide comprising the steps of:
slaking the calcium oxide source in water to produce an aqueous hydrated lime slurry;
treating the aqueous hydrated lime slurry by the addition thereto of a water soluble ammonium salt that is a source of anions, the anions are capable of forming a salt with calcium ions, the salt has a dissociation constant greater than the dissociation constant of calcium hydroxide;
separating the solid content of the slurry from the liquid fraction content thereof to obtain a substantially solids-free solution of calcium ions and anions;
intimately contacting the solids-free liquid fraction with carbon dioxide selectively to initiate the precipitation of calcium carbonate in which the calcite crystal form predominates; and
separating the precipitated calcium from the mother liquor;
wherein the calcium is present in a solution in a concentration greater than 5% and the carbonation of the solution is carried out at a rate of less than or equal to about 1 liter $CO_2$-gas per minute per liter of solution until the pH of the solution has dropped to below 8, while the temperature of the solution is kept in the range between $-20°$ C. and $20°$ C.

18. A method for producing relatively pure calcium carbonate from a relatively impure source of calcium oxide comprising the steps of:
slaking the calcium oxide source in water to produce an aqueous hydrated lime slurry;
treating the aqueous hydrated lime slurry by the addition thereto of a water soluble ammonium salt that is a source of anions, the anions are capable of forming a salt with calcium ions, the salt has a dissociation constant greater than the dissociation constant of calcium hydroxide;
separating the solid content of the slurry from the liquid fraction content thereof to obtain a substantially solids-free solution of calcium ions and anions;
intimately contacting the solids-free liquid fraction with carbon dioxide selectively to initiate the precipitation of calcium carbonate in which the vaterite crystalline form predominates; and
separating the precipitated calcium from the mother liquor;
wherein the starting material is a solution of calcium hydroxide of a concentration of about 5% or less and the carbonation of the solution is carried out at a temperature of between $18°$ C. and $30°$ C. by introducing a 20% $CO_2/N_2$ mixture at a rate of at least 5 liters per minute per liter solution into the solution and the carbonation is terminated when the pH of the solution reaches a value of between 8.1 and 8.3.

19. A method for producing relatively pure calcium carbonate from a relatively impure source of calcium oxide comprising the steps of:
slaking the calcium oxide source in water to produce an aqueous hydrated lime slurry;
treating the aqueous hydrated lime slurry by the addition thereto of a water soluble ammonium salt that is a source of anions, the anions are capable of forming a salt with calcium ions, the salt has a dissociation constant greater than the dissociation constant of calcium hydroxide;
separating the solid content of the slurry from the liquid fraction content thereof to obtain a substantially solids-free solution of calcium ions and anions;
intimately contacting the solids-free liquid fraction with carbon dioxide selectively to initiate the precipitation of calcium carbonate in which the aragonite crystal form predominates; and
separating the precipitated calcium from the mother liquor;
wherein the starting material is a 5% solution of $Ca(OH)_2$ in water and is carbonated at a temperature of between $30°$ C. and $38°$ C. with $CO_2$ at a carbonation rate of more than 9 liters per minute per liter of solution until the pH of the solution has dropped to between 8 and 8.5.

* * * * *